Patented June 2, 1936

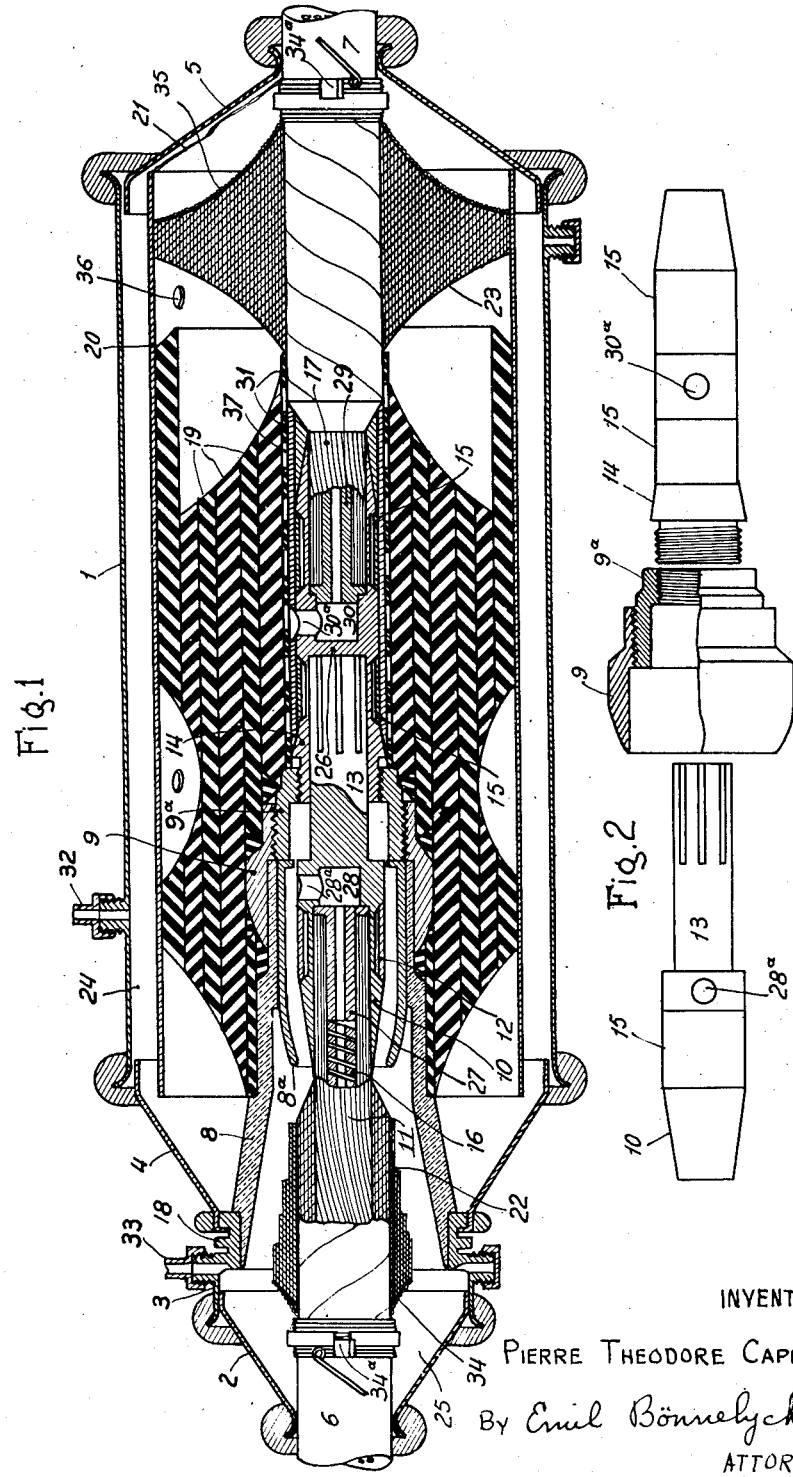

2,043,033

UNITED STATES PATENT OFFICE 2,043,033

UNDERGROUND ELECTRIC CABLE

Pierre Théodore Capdeville, Nogent-sur-Marne, France, assignor to Trefileries & Laminoirs du Havre, Paris, France Application August 15, 1934, Serial No. 739,995
In France August 25, 1933

7 Claims. (Cl. 173—268)

The invention relates to underground electric cables of the type comprising a stranded conductor which is applied over a hollow core whose internal duct is filled with oil or other liquid insulation. The conductor is covered by an insulating substance, for instance paper, which is impregnated with oil or other liquid insulation and around which is an hermetical lead sheath.

In cables of this kind, the oil which fills the central duct or channel of the core and which wets the metal conductors and impregnates the insulating substance is kept at a suitable pressure by means of oil containing reservoirs. When, under the influence of current flow, the cable becomes heated, the oil which it contains expands, and a certain quantity of oil flows into the reservoir. Inversely, when the cable cools, the oil which it contains contracts, and the reservoir discharges oil into the cable, consequently, the latter is always full of oil under pressure.

When the cable is very long, it is advisable to subdivide it into several sections, each provided with special oil reservoirs, in order to avoid: first, in an inclined cable section, too high a hydrostatic pressure at the low points of that section; second, in extensive horizontal cable sections, too considerable a longitudinal displacement of liquid between the central canal or duct and the filled reservoirs.

In order to connect two consecutive sections with each other, a device is used called a "stop joint", which insures the electrical continuity and also the insulation with respect to ground, of the various parts that are inter-connected but which forms a stop between the oil contained in one section and the oil contained in the adjacent section. This joint makes it possible to connect oil reservoirs to both sides of the joint so as to feed with oil two adjacent sections.

The object of the invention is the provision of a stop joint of improved and simplified construction.

For a consideration of what I believe to be novel and my invention, attention is directed to the accompanying description and the claims appended thereto.

In the attached drawing, which is illustrative of my invention, Fig. 1 is a longitudinal section of a stop joint and Fig. 2 is an exploded view of the connector members or parts.

The stop joint which is shown in the drawing comprises an hermetically sealed metal envelope constituted by a cylindrical body 1 connected through the intermediate caps 2, 3, 4 and 5 to the lead sheath of the two cables 6 and 7 which are to be interconnected. These various parts are secured to each other through wipe soldering.

The inside of the casing is subdivided into two chambers, a large one 24 and a small one 25, by means of an oil-impervious insulating tube 8, a hollow metal sleeve 9, and the various connecting parts which are suitably insulated with respect to ground. The right hand end of the sleeve 9 is screw threaded and in engagement therewith is an externally screw threaded short sleeve 9ª. The opposite end of the short sleeve is internally threaded to receive the threaded end of the connector member 14. The sleeves are made separately and then threaded together so that the parts of the joint may be properly assembled, and especially the insulator 8.

The electric continuity of the cable is insured by the socketed connector member 10 which is secured to the stranded conductor 11 and by the other member to be referred to later. Prior to mounting the connector member in place, a few of the end turns of the open helix 16, located within the stranded conductor for supporting it are removed, and for the turns so removed is substituted a steel tube 27 which acts as support for conductor 11 during the compressing of the connector member 10. The tube has a flanged head which engages the ends of the conductor strands and also the bottom of the socket formed in the member 10. The wall of the socket is tightly squeezed against the conductor 11 by the use of a suitable press, and the groove 12 which has been formed during that operation is covered by a metal ring 15, so as to present a smooth unbroken exterior and thus avoid concentration of electrical stresses.

Formed integral with the connector member 10 is a cylindrical extension or rod 13 which extends into and is seated in a socket formed in a second connector member 14, said rod and socket being in telescopic relation. The part 13 may have longitudinal grooves, as shown, the walls of which assist in making a good electrical joint. The second connector member and rod are united by compressing or squeezing the former on the latter. In the right hand end of the second connector member is a socket into which is fitted the end of conductor 17, and these parts are also united by compression. The grooves formed in such operations are covered with bands 15 for the same reason as before.

In this manner, conductors and connecting parts are fitted together in succession and very good electric conductivity attained between the various parts.

The assembled parts are held in the center of the cylindrical body 1 by the hollow metal sleeve 9, into which is screwed the connector member 14. The sleeve 9 is secured to the outside of the inner end of the insulating tube 8, and the latter is held rigidly at its outer end by a metal collar 18, which insures the centering of the assembled parts with respect to the metal casing, as well as their insulation in a longitudinal direction. The insulating sleeve or tube 8 is supported on the inside by a tubular metallic support 8ª which also acts as a shield. It will be noted that the right hand end of the tube is located between two opposed cylindrical surfaces so that it is well supported. This permits the use of a thinner insulation than would otherwise be allowable. The joints between the parts may be made fluid tight by any suitable means, as for example by first coating the adjacent surfaces with metal and then soldering them. The outer end of the insulating tube 8 being supported by the metal ring 18, may be united with it in the same manner.

Around the connector 14 and the sleeve 9 are wound bands 19 consisting of a fibrous material which is impregnated with oil and which insures the insulation of the members 10 and 14 and sleeve 9 with respect to a metal cylinder 20, the latter being connected by means of the metal ribbon 21 to the lead of the cable 7 and to ground. Openings, for instance 36, are provided in the cylinder 20, and all the cavities within that metal cylinder are filled with oil under pressure.

Each one of the ends of cables 6 and 7 has its lead sheath removed and is wrapped with paper tapes 22 and 23 over the factory applied insulation, allowance being made for extra thickness, the paper tapes being themselves covered with metal electrostatic shields 34 and 35, to distribute the electrical stresses, said shields being grounded to the lead sheaths by clamps 34ª.

The flow of oil between the outer chamber 24 and the inner left hand chamber 25 is prevented as follows: The caps 3 and 4 of the casing are fitted and soldered to collar 18. The tube 8 which is insulating and impervious to oil is secured hermetically to the ring or collar 18 and to the metal sleeve 9. The connector member 14 which is screwed and soldered to sleeve 9 has a transverse wall 26 so that oil cannot flow from chamber 24 to chamber 25, and vice versa.

On the other hand, the hollow core of cable 6 communicates with the left hand chamber 25 by means of the steel tube 27 and by the recess 28 and port 28ª in connector 10. In this manner, the oil can flow from the central channel of the conductor 11 to the chamber 25, and vice versa.

Likewise, cable 7 has a steel tube 29 which communicates with the connector 14. The central portion of the connector has a recess 30 and a lateral port 30ª. The port communicates with the helicoidal conduit 37 which is made by winding a relatively thick paper tape 31 around the connector 14 and insulation thereon so that it forms a long open helix of restricted cross-sectional area. As a result of this conduit and of holes 36, oil can flow from conductor 7 to chamber 24, and vice versa.

Pipe connections 32 and 33 between the chambers 24 and 25 and reservoirs (not shown) make it possible independently to supply with oil the two adjacent sections constituted by the cables 6 and 7. One of the advantages of my improved construction resides in the fact that it is shorter than other joints for the same purpose and hence smaller manholes may be used, and being shorter takes less material with a corresponding reduction in cost.

Such a joint as described herein can be assembled in a very simple manner at the place of installation of the cables. The only insulation which must be provided consists of tape made of fibrous material wrapped around the conducting bodies, as is customary with normal joints.

A further and material advantage of my improved construction resides in the fact that it is substantially shorter than other constructions intended for the same purpose. This is due chiefly to the fact that only one preformed insulator, such as 8, has to be provided which is in telescopic relation to the socket of the connector part enclosed thereby. This latter arrangement permits of supporting the inner end of the insulator not by the connector which it surrounds but by the second connector member, in this case through the medium of sleeves 9 and 8ª. The reduction in length of the joint is due not only to the absence of the second insulator but to the elimination of the space required for the connecting means between adjacent ends of the insulators.

It is to be understood that the invention is not limited in all respects to the arrangement which has been shown in the drawing by way of example, and that modifications of details may be applied.

What I claim as new and desire to secure by Letters Patent of the United States is:—

1. In a cable joint of the character described, the combination of a pair of conductors arranged end to end, each having a central fluid filled channel, means for electrically uniting the conductors and interrupting the passage of fluid from one channel to the other, said means comprising a first connector member connected to one of said conductors and a second connector member connected to the other of said conductors, a ported recess in each connector member communicating with the channel in the conductor to which said connector member is attached, a casing for enclosing the parts of the joint, a unitary tubular insulator supported at its one end by the first connector member and supported at its other end by the casing, said insulator surrounding one end of said second connector member and defining an independent chamber within the main chamber of the casing, said independent chamber communicating with the port of the recess of said second connector member, an external conduit connected to said independent chamber, a conduit of small cross-sectional area forming a helix of many turns surrounding the first connector member and communicating with the port of the recess of said first connector member and with the main chamber of the casing, a covering of insulation for both connector members and in which the helical conduit is located, and an external conduit connected to the main chamber of the casing.

2. In a cable joint of the character described, the combination of a first connector member having a socket and a lateral port communicating therewith, a first conductor having an insulating covering and having a central fluid filled channel, said conductor having one end located in the socket with its channel in communication with the port, a second connector member mounted in the first member and also having a socket and a lateral port communicating therewith, a second conductor having an insulating covering and having a central fluid filled channel, said second conductor having one end located in the socket of the second connector member with its channel in communication with the port thereof, said connector members interrupting the passage of fluid from one conductor channel to the other, a metal casing enclosing the parts of the joint and sealed to the outer coverings of both conductors, a tubular insulator supported in spaced relation to the end of the first conductor and surrounding the first connector member and its lateral port, a metal sleeve mounted on the second connector member and supporting one end of the insulator, a metal member supporting the other end of the insulator and defining a part of said casing, the insulator thus dividing the casing into a main chamber and an independent chamber, fluid being free to flow to or from the channel of the first conductor, through the port of the first connector member into the independent chamber, a helical conduit of numerous turns surrounding the second connector member, communicating with the lateral port thereof and opening into the main chamber of the casing, and insulation applied over the helical conduit and one end of the insulator.

3. In a cable joint of the character described, the combination of a first connector member having a conductor receiving socket and ported recess at one end and a solid extension at the other, a second connector member having a socket at one end receiving the extension of the first connector member and having a conductor receiving socket and ported recess at its other end, a metallic sleeve mounted on the wall of the second connector member and extending longitudinally over a part of the first conductor member, a pair of fluid filled conductor ends from which the insulating coverings have been stripped, one such conductor end being located in each of the conductor receiving sockets of the members, a metal casing enclosing the parts of the joint, a conical insulator within the casing supported at its inner end by the sleeve and at its outer end by the casing and dividing the casing into a main chamber and an independent chamber at one end thereof, the latter communicating with the ported recess in the first connector member, said connector members interrupting the passage of fluid from one conductor end to the other, insulation wrapped around the second connector member, the sleeve and a part of the conical insulator, and a helically formed conduit of numerous turns embedded in the portion of the insulation covering the second connector member, which is in communication with the ported recess of the second member and with the interior of the main chamber of the casing.

4. In a cable joint of the character described, the combination of a first connector member having a socket and a ported recess at one end and a solid extension at the other, a hollow core fluid filled cable conductor end located in the socket, the core communicating with the ported recess, a second connector member having sockets at both ends, in one of which is located said extension, the other of said sockets having a ported recess, a hollow core fluid filled cable conductor end located in the last mentioned socket, the core communicating with the ported recess, said members electrically connecting the cables and preventing the flow of fluid from one to the other, an enclosing casing sealed at its ends to the conductor coverings, a metallic sleeve screw threaded to one end of the second connector member and surrounding a part of the extension of the first connector member, an insulator supported at its inner end by the sleeve, means forming a part of the casing for supporting the outer end of the insulator, said insulator and its supports dividing the casing into a small and a large chamber, the small chamber being in direct communication with the port of the recess of the first connector member, an insulating covering for both connector members, and a conduit means located in the insulating covering and establishing communication between the port of the recess of the second connector member and the large chamber.

5. A joint for fluid filled cable comprising a first connector member having a rod-like extension at one end, and a socket at the other, a hollow core fluid filled conductor end located within the socket, a second connector member having sockets on opposite ends thereof in one of which said extension is located, a second hollow fluid filled conductor having one end located in the other of said sockets, ports in the conductor end receiving sockets of the members in communication with the cores of the conductors, said connector members electrically connecting the cable ends and preventing the flow of fluid from one cable end into the other, a longitudinally extending tubular insulator which surrounds the socket of the first member, a metal sleeve supported by the second member which is in telescopic relation with respect to portions of the extension and the first connector member and which engages and supports the inner end of the insulator, a chambered casing for the joint which also supports the outer end of the insulator, said insulator dividing the chamber of the casing into two parts, one of which is in communication with the port opening into the core of one conductor and the other with the port opening into the core of the other conductor, and insulation which is wrapped around the members and also around the inner end of the tubular insulator.

6. In a cable joint of the character described, the combination of a first connector member having at one end a socket to receive the wires of the end of a cable having a core filled with fluid and also a ported recess adjacent the cable end to receive fluid from the core, and at the other end a rod-like extension, a second connector member having at one end a socket in which said extension is located, the socket and extension being in telescopic relation, and at the other end a socket to receive wires of the end of a second cored cable, said connector member preventing the flow of fluid from one cable end to the other, a sleeve mounted on and supported by one end of the second member, a second sleeve mounted on and supported by the first mentioned sleeve and forming an axial extension thereof and surrounding a part of the first connector member, an insulator having its inner end located within one end of the second sleeve and supported externally thereby, a tubular metal member located inside of the insulator at the inner end thereof for supporting it internally, a casing enclosing parts of the joint, and a means forming a part of the casing which supports the outer end of the insulator.

7. A combined feeding and fluid stop joint comprising a first connector member having sockets at both ends, and a laterally opening ported recess located between the sockets, a first conductor end having a central core filled with fluid located in one of the sockets, the core and recess being in communication, a second connector member having a rod-like extension at one end fitted into a socket of the first member and a socket at the other end, and a laterally opening ported recess located between the socket and the extension, a second conductor end having a central core filled with fluid located in the socket of the second connector member, the core of the second conductor and the recess of the second connector member being in communication, the two members electrically uniting the conductor ends and preventing the flow of fluid from one to the other, a casing surrounding the members and cable ends and sealed to the coverings of said ends, a preformed insulator dividing the casing chamber into a large and a small chamber, the latter being located at one end of the casing and communicating with the ported recess of the second cable connector member, a metallic means supported by the first connector member and surrounding a portion of the second connector member in telescopic relation for supporting the inner end of the preformed insulator, a means supported by a wall of the casing for supporting the outer end of the preformed insulator, a wrapping of insulating material around the first connector member, the turns of which are spaced to form an open helix of restricted cross-section, the helix being in free communication with the ported recess in the first connector member and also with the large chamber of the casing, and a conduit means for feeding fluid to and receiving it from said large chamber.

PIERRE THÉODORE CAPDEVILLE.